(12) United States Patent
Zetterberg et al.

(10) Patent No.: US 10,887,807 B2
(45) Date of Patent: Jan. 5, 2021

(54) METHODS TO INFORM UE OF IDLE MODE SS IDENTITY

(71) Applicant: Telefonaktiebolaget LM Ericsson (publ), Stockholm (SE)

(72) Inventors: Kristina Zetterberg, Linköping (SE); Icaro L. J. da Silva, Solna (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 94 days.

(21) Appl. No.: 16/335,351

(22) PCT Filed: Sep. 29, 2017

(86) PCT No.: PCT/SE2017/050959
§ 371 (c)(1),
(2) Date: Mar. 21, 2019

(87) PCT Pub. No.: WO2018/063083
PCT Pub. Date: Apr. 5, 2018

(65) Prior Publication Data
US 2019/0320367 A1    Oct. 17, 2019

Related U.S. Application Data

(60) Provisional application No. 62/402,696, filed on Sep. 30, 2016.

(51) Int. Cl.
*H04W 36/12* (2009.01)
*H04W 76/27* (2018.01)
*H04W 36/24* (2009.01)

(52) U.S. Cl.
CPC ........... *H04W 36/12* (2013.01); *H04W 36/24* (2013.01); *H04W 76/27* (2018.02)

(58) Field of Classification Search
CPC . H04W 36/12; H04W 36/24; H04W 36/0072; H04W 76/27; H04W 48/16; H04W 56/00; H04W 52/0216
See application file for complete search history.

(56) References Cited

U.S. PATENT DOCUMENTS

| 2012/0218934 A1* | 8/2012 | Takehana | H04W 84/047 370/315 |
| 2016/0007406 A1* | 1/2016 | Yi | H04W 24/02 370/252 |
| 2016/0066255 A1* | 3/2016 | Marinier | H04W 48/16 370/350 |

OTHER PUBLICATIONS

Unknown, Author, "Intra-5G Mobility related requirements", 3GPP TSG-RAN WG2 Meeting #95, R2-164725, 'Gothenburg, Sweden, Aug. 22-26, 2016, 1-2.

(Continued)

*Primary Examiner* — Curtis A Alia
(74) *Attorney, Agent, or Firm* — Sage Patent Group

(57) ABSTRACT

In one aspect, a method in a wireless device for facilitating a transition of the wireless device between an active state and an inactive state or idle mode includes storing an identifier of an idle mode synchronization signal of a source node serving the wireless device responsive to entering an active state from an inactive state or idle mode, reentering the inactive state or idle mode and monitoring the idle mode synchronization signal of the source node while in the inactive state or idle mode.

26 Claims, 17 Drawing Sheets

(56) References Cited

OTHER PUBLICATIONS

Unknown, Author, "Introduction of "Cell" concept in 5G", 3GPP TSG-RAN WG2 Meeting #94, R2-163365, Nanjing, China, May 23-27, 2016, 1-4.

* cited by examiner

800

TRANSMIT AN IDENTIFIER OF AN IDLE MODE
SYNCHRONIZATION SIGNAL OF A TARGET NODE IN A
HANDOVER COMMAND TO THE WIRELESS DEVICE
DURING ACTIVE STATE HANDOVER TO A TARGET NODE
802

*FIG. 8*

THE DEVICE TRANSITS FROM INACTIVE STATE OR IDLE MODE TO ACTIVE MODE AND STORES THE IDLE MODE SYNCHRONIZATION SIGNAL BASED ON WHICH IT ACCESSED THE SYSTEM
100

*FIG. 10*

METHODS TO INFORM UE OF IDLE MODE SS IDENTITY

TECHNICAL FIELD

The present invention generally relates to synchronization signals in wireless communication networks, and particularly relates to facilitating a transition of a wireless device between an active state and an inactive state or idle mode.

BACKGROUND

FIG. 1 depicts a proposed solution for downlink-based active mode mobility in 3GPP 5G New Radio (NR). The wireless device in FIG. 1 is served by the leftmost node but is traveling towards the rightmost node. The device uses the best home measurement reference signal or "home MRS" for coarse timing estimation, radio link quality monitoring and failure detection (denoted by the shaded ovals from the left node in FIG. 1).

In addition, the device monitors a sparse periodic MRS from the serving node and compares it with similar periodic and sparse MRSs from potential target nodes. When a target node becomes relevant for a more detailed handover procedure, additional dynamically configured home MRSs and dynamically configured away MRSs may be activated. The final handover decision is made by the network and it is based on device reports containing measurement of home MRSs and away MRSs.

An example of system information acquisition proposed for 5G NR is depicted in FIG. 2. In the example, each node (e.g., transmission reception point (TRP), radio base station (RBS), eNB or gNB) transmits a synchronization signal or a system signature signal (SS). Together with the SS, each node also transmits a physical broadcast channel (PBCH) containing some of the minimum system information that the device (e.g., user equipment, or UE) needs to access the network. This part of the minimum system information is denoted as a master information block (MIB) in FIG. 2. The transmission of the SS and the PBCH containing the MIB is denoted with the two smaller ovals in FIG. 2.

By reading the MIB, the UE receives information on how to receive the system information block (SIB) table. The SIB table may be transmitted using a broadcast format such as single frequency network (SFN) transmission, and the SIB transmission is depicted in FIG. 2 by the larger oval surrounding the other ovals.

In addition to the minimum system information that is periodically broadcasted in the SS+MIB and in the SIB-table, the UE may receive other system information in, for example, a dedicated transmission after initial access is established (depicted by the smaller oval at the left node in FIG. 2).

One requirement regarding inter-gNB mobility in NR is to minimize context move as a consequence of UE based mobility. In LTE, an eNB can trigger a transition from RRC CONNECTED to RRC IDLE based on different criteria, such as inactivity timers. Once in RRC IDLE, the UE can perform cell reselection and, depending on the way the network configures cell reselection thresholds, the UE may end up reselecting to a cell that belongs to a different eNB. Different thresholds could be used, for example, in scenarios requiring load balancing. At the moment the UE resumes its RRC connection, it will start to perform measurements and send reports that could trigger handovers back to the eNB to which the UE was connected previously. This could be seen as an eNB ping-pong at IDLE to CONNECTED state transitions. This problem would introduce unnecessary signaling over the air interface every time a state transition occurs and it is likely that transitions will occur quite often in LTE.

This is solved in LTE by the fact that the UE can be configured with an offset before being moved to IDLE. However, in NR, a Connected UE may rely on different signals to perform mobility procedures so that the UE is not aware of the cell it would camp on when it goes to IDLE.

Therefore, it is recognized herein that NR is lacking a mechanism to avoid inter gNB mobility of a UE upon state transitions between CONNECTED and IDLE (or an inactive state). The solution used for LTE is not applicable.

In addition to handover signaling over the air interface, this scenario would also generate unnecessary signaling over X2-like interfaces. For example, when the UE moves to IDLE in eNB-1, the context is stored there. When the UE reselects to a cell in eNB-2, the UE will try to resume, which will trigger context fetching over X2. Once the UE resumes its RRC connection and a handover is triggered, the context will be moved again. This could be referred to as a double context move.

SUMMARY

It is recognized herein that NR should include support for mechanisms that avoid inter gNB mobility and double context moves as a consequence of mobility upon state transitions between CONNECTED and IDLE. To address these problems, various embodiments described herein can assist an active UE (e.g., in RRC CONNECTED state) connected to an access node with performing a transition to a sleeping state (e.g., RRC IDLE and/or any similar inactive state), where UE-based mobility may occur. This may include camping in the same access node (or cells/beams) where the coverage in connected mode is different from the coverage in idle mode. That scenario may occur, for example, when the network uses different beamforming configurations in connected mode (e.g., high gain beamforming) compared to idle mode/inactive state (e.g., single beam or beamforming with wider and fewer beams than in connected mode).

Additionally, the UE may also need to have information on which synchronization signal or signature (SS) to measure when going to idle mode/inactive state. This could especially be needed in the case where there are carriers with no SSB transmission, where the UE would need to monitor transmissions from another node in order to retrieve the SS of the target node.

The various embodiments aid the transition from idle mode/inactive state to active state (the UE will connect to the correct active mode cell) and the transition from active to idle mode/inactive state (the UE will know which SS to monitor in idle mode/inactive state).

According to one aspect, a UE can obtain an identifier of the idle mode synchronization signal or signature of the serving node that it is connected to in active mode.

According to some embodiments, a method in a wireless device operating in a wireless communication network, for facilitating a transition of the wireless device between an active state and an inactive state/idle mode, includes storing an identifier of an idle mode synchronization signal of a source node serving the wireless device responsive to entering an active state from an inactive state/idle mode. The method also includes the wireless device reentering the inactive state/idle mode and monitoring the idle mode synchronization signal of the source node while in the inactive state/idle mode. Monitoring may include performing measurements for reselection purposes.

According to some embodiments, a method in a wireless device operating in a wireless communication network, for facilitating a transition of the wireless device between an active state and an inactive state/idle mode, includes obtaining an identifier of an idle mode synchronization signal of a target node during active state handover from a source node serving the wireless device to a target node, accessing the target node as part of the handover and storing the identifier of the idle mode synchronization signal of the target node. The method also includes reentering the inactive state/idle mode and monitoring the idle mode synchronization signal of the target node while in the inactive state/idle mode According to some embodiments, a method in a wireless device operating in a wireless communication network, for facilitating a transition of the wireless device between an active state and an inactive state/idle mode, includes accessing a target node as part of a handover from a source node serving the wireless device to the target node, obtaining an idle mode synchronization signal of the target node via RRC signaling after handover is performed and storing the identifier of the idle mode synchronization signal of the target node. The method also includes reentering the inactive state/idle mode and monitoring the idle mode synchronization signal of the target node while in the inactive state/idle mode.

According to some embodiments, a method in a source node serving a wireless device in a wireless communication network, for facilitating a transition of the wireless device between an active state and an inactive state/idle mode, includes transmitting an identifier of an idle mode synchronization signal of a target node in a handover command to the wireless device during active state handover to a target node.

According to some embodiments, a method in a target node for a wireless device in a wireless communication network, for facilitating a transition of the wireless device between an active state and an inactive state/idle mode, includes attaching the wireless device to the target node as part of the handover, receiving a handover completion message from the wireless device and transmitting an identifier of an idle mode synchronization signal of a target node to the wireless device.

According to some embodiments, a wireless device configured to operate in a wireless communication network and transition between an active state and an inactive state/idle mode includes transceiver circuitry configured for transmitting and receiving signals and processing circuitry operatively associated with the transceiver circuitry. The processing circuitry is configured to store an identifier of an idle mode synchronization signal of a source node serving the wireless device responsive to entering an active state from an inactive state/idle mode, reenter the inactive state/idle mode and monitor the idle mode synchronization signal of the source node while in the inactive state/idle mode.

According to some embodiments, a wireless device configured to operate in a wireless communication network and transition between an active state and an inactive state/idle mode includes transceiver circuitry configured for communicating with the network and processing circuitry operatively associated with the transceiver circuitry. The processing circuitry is configured to obtain an identifier of an idle mode synchronization signal of a target node during active state handover from a source node serving the wireless device to a target node, access the target node as part of the handover and store the identifier of the idle mode synchronization signal of the target node. The processing circuitry is also configured to reenter the inactive state/idle mode and monitor the idle mode synchronization signal of the target node while in the inactive state/idle mode.

According to some embodiments, a wireless device configured to operate in a wireless communication network and facilitate a transition of the wireless device between an active state and an inactive state/idle mode includes transceiver circuitry configured for communicating with the network and processing circuitry operatively associated with the transceiver circuitry. The processing circuitry is configured to access a target node as part of a handover from a source node serving the wireless device to the target node, obtain an idle mode synchronization signal of the target node via RRC signaling after handover is performed and store the identifier of the idle mode synchronization signal of the target node. The processing circuitry is also configured to reenter the inactive state/idle mode and monitor the idle mode synchronization signal of the target node while in the inactive state/idle mode.

According to some embodiments, a source node configured to serve a wireless device in a wireless communication network and facilitate a transition of the wireless device between an active state and an inactive state/idle mode includes communication interface circuitry configured to communicate with other network nodes, transceiver circuitry configured to communicate with the wireless device and processing circuitry operatively associated with the communication interface circuitry and the transceiver circuitry. The processing circuitry is configured to transmit an identifier of an idle mode synchronization signal of a target node in a handover command to the wireless device during active state handover to a target node.

According to some embodiments, a target node configured to facilitate a transition of a wireless device between an active state and an inactive state/idle mode includes communication interface circuitry configured to communicate with other network nodes, transceiver circuitry configured to communicate with the wireless device and processing circuitry operatively associated with the communication interface circuitry and the transceiver circuitry. The processing circuitry is configured to attach the wireless device to the target node as part of the handover from a source node serving the wireless device to the target node, receive a handover completion message from the wireless device and transmit an identifier of an idle mode synchronization signal of a target node to the wireless device.

Additional embodiments may include the method implemented by apparatus, devices, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 8 shows a flow chart illustrating a method at a source node for facilitating a transition of the wireless device between an active state and an inactive state/idle mode, according to some embodiments.

FIG. 10 shows a flow chart illustrating a method for facilitating a transition of the wireless device between an active state and an inactive state/idle mode, according to some embodiments.

DETAILED DESCRIPTION

Embodiments described herein can assist an active wireless device connected to an access node with performing a transition to an inactive state or idle mode, where device-based mobility may occur.

Figure 1:
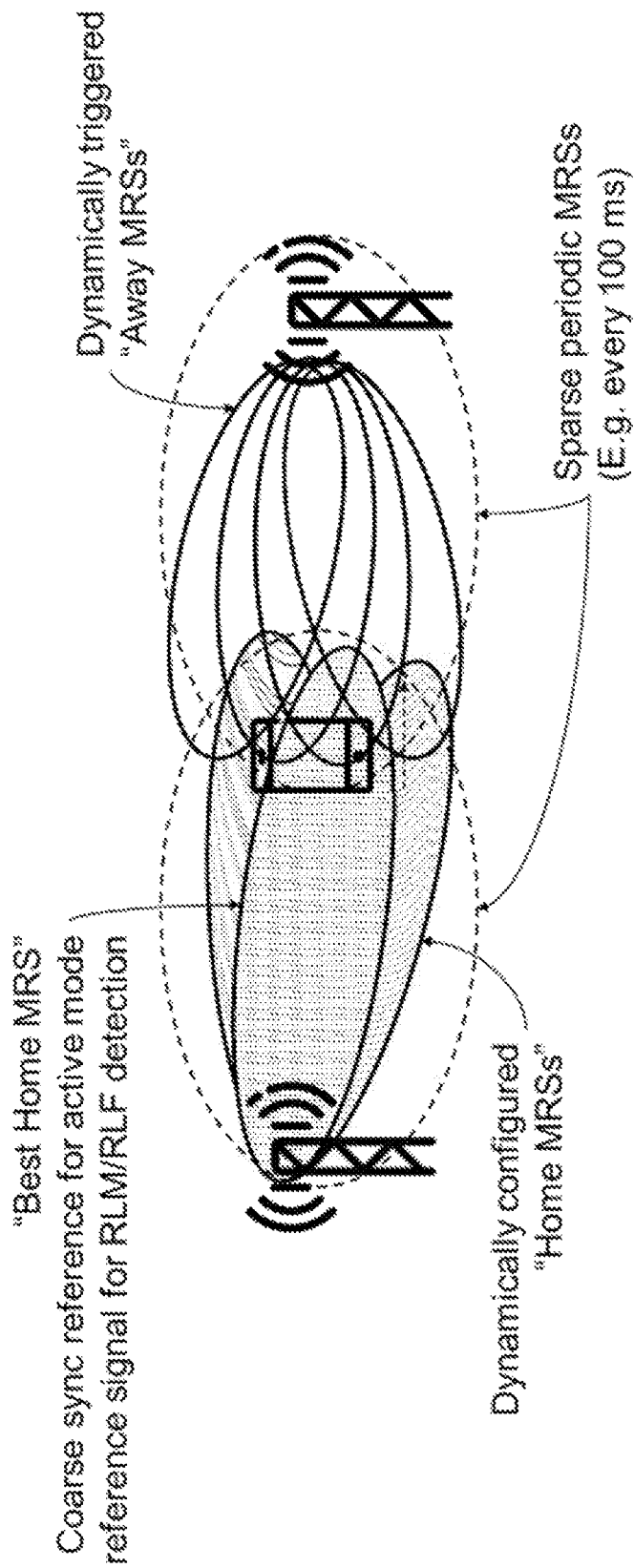
FIG. 1 illustrates an overview of the downlink based active mode mobility solution proposed for 3GPP 5G New Radio (NR).
Figure 2:
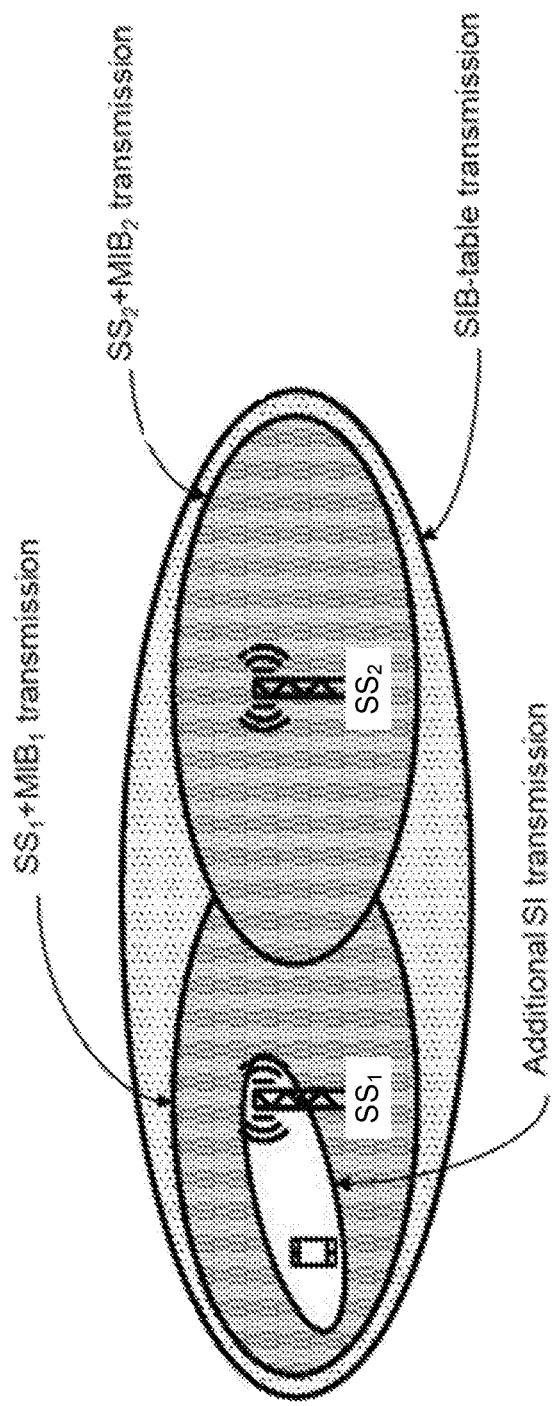
FIG. 2 illustrates an overview of a proposed solution for system information acquisition in NR.
Figure 3:
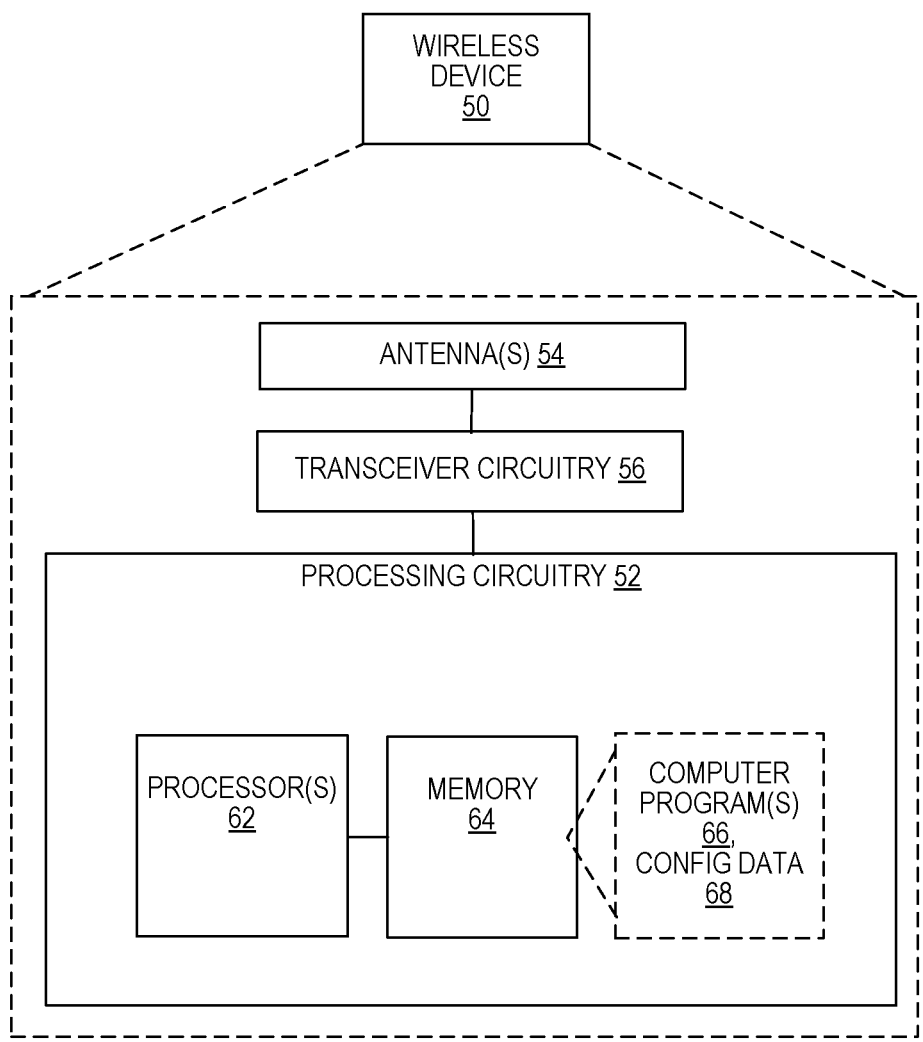
FIG. 3 is a block diagram illustrating a wireless device, according to some embodiments.

FIG. 3 illustrates a block diagram of a wireless device 50, according to some embodiments. The wireless device 50 may be a UE, a radio communication device, target device (device targeted for communication), D2D UE, machine type UE or UE capable of M2M, a sensor equipped with UE, iPAD, Tablet, mobile terminals, smart phone, LEE, LME, USB dongles, CPE, etc.

The wireless device 50 communicates with one or more nodes, via antennas 54 and transceiver circuitry 56. The transceiver circuitry 56 may include transmitter circuits, receiver circuits, and associated control circuits that are collectively configured to transmit and receive signals according to a radio access technology, for the purposes of providing cellular communication services. According to various embodiments, cellular communication services may be operated according to, for example, NR standards.

The wireless device 50 includes processing circuitry 52 that is operatively associated with the transceiver circuitry 56. The processing circuitry 52 comprises one or more digital processing circuits, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 64 comprises any one or more of SRAM, DRAM, EEPROM, and FLASH memory, which may be in the processing circuitry 52 and/or separate from processing circuitry 52. The memory 64 may also store any configuration data 68 used by the wireless device 50.

In some embodiments, the processor 62 of the processing circuitry 52 may execute a computer program 66 stored in the memory 64 that configures the processor 62 to facilitate a transition of the wireless device between an active state and an inactive state/idle mode. The processing circuitry 52 may be configured to store an identifier of an idle mode synchronization signal of a source node serving the wireless device responsive to entering an active state from an inactive state/idle mode, reenter the inactive state/idle mode and then monitor the idle mode synchronization signal of the source node while in the inactive state/idle mode. This may include performing measurements for node and beam reselection purposes.

In other embodiments, the processing circuitry 52 is configured to obtain an identifier of an idle mode synchronization signal of a target node during active state handover from a source node serving the wireless device to a target node, access the target node as part of the handover and store the identifier of the idle mode synchronization signal of the target node.

In some embodiments, the processing circuitry 52 is configured to access a target node as part of a handover from a source node serving the wireless device to the target node, obtain an idle mode synchronization signal of the target node via RRC signaling after handover is performed and store the identifier of the idle mode synchronization signal of the target node.

Figure 4:
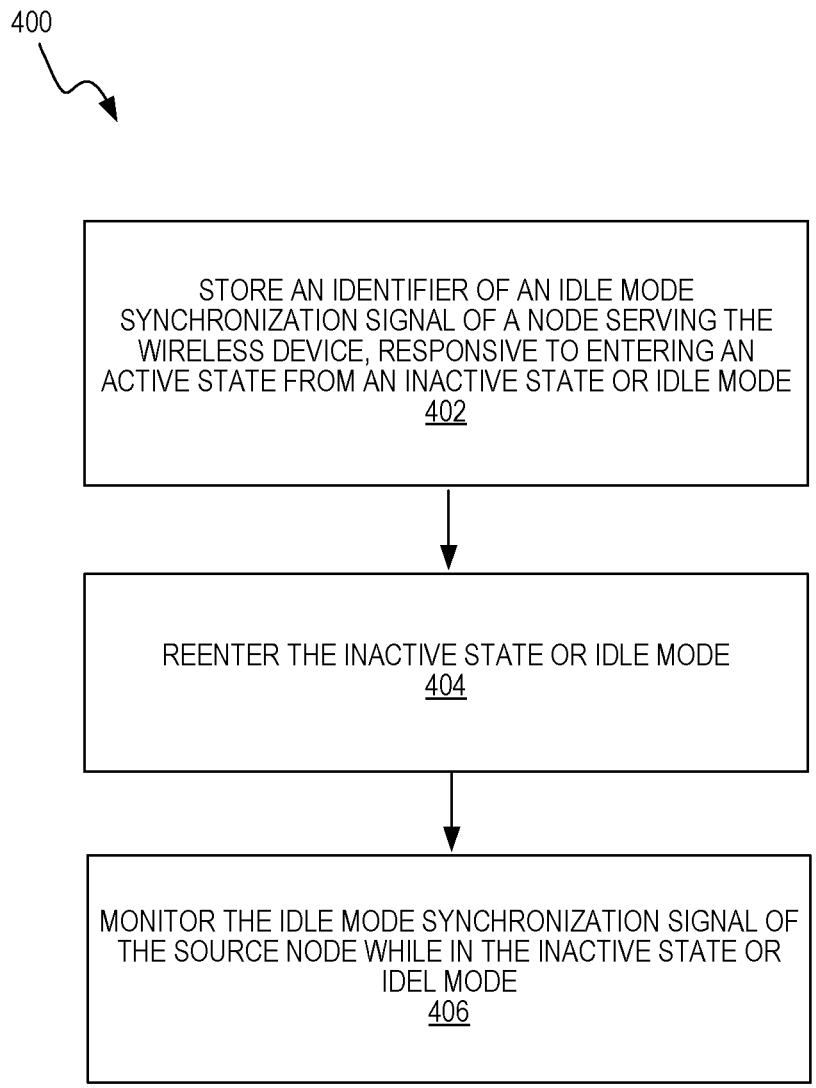
FIG. 4 shows a flow chart illustrating a method at the wireless device for facilitating a transition of the wireless device between an active state and an inactive state/idle mode, according to some embodiments.
Figure 5:
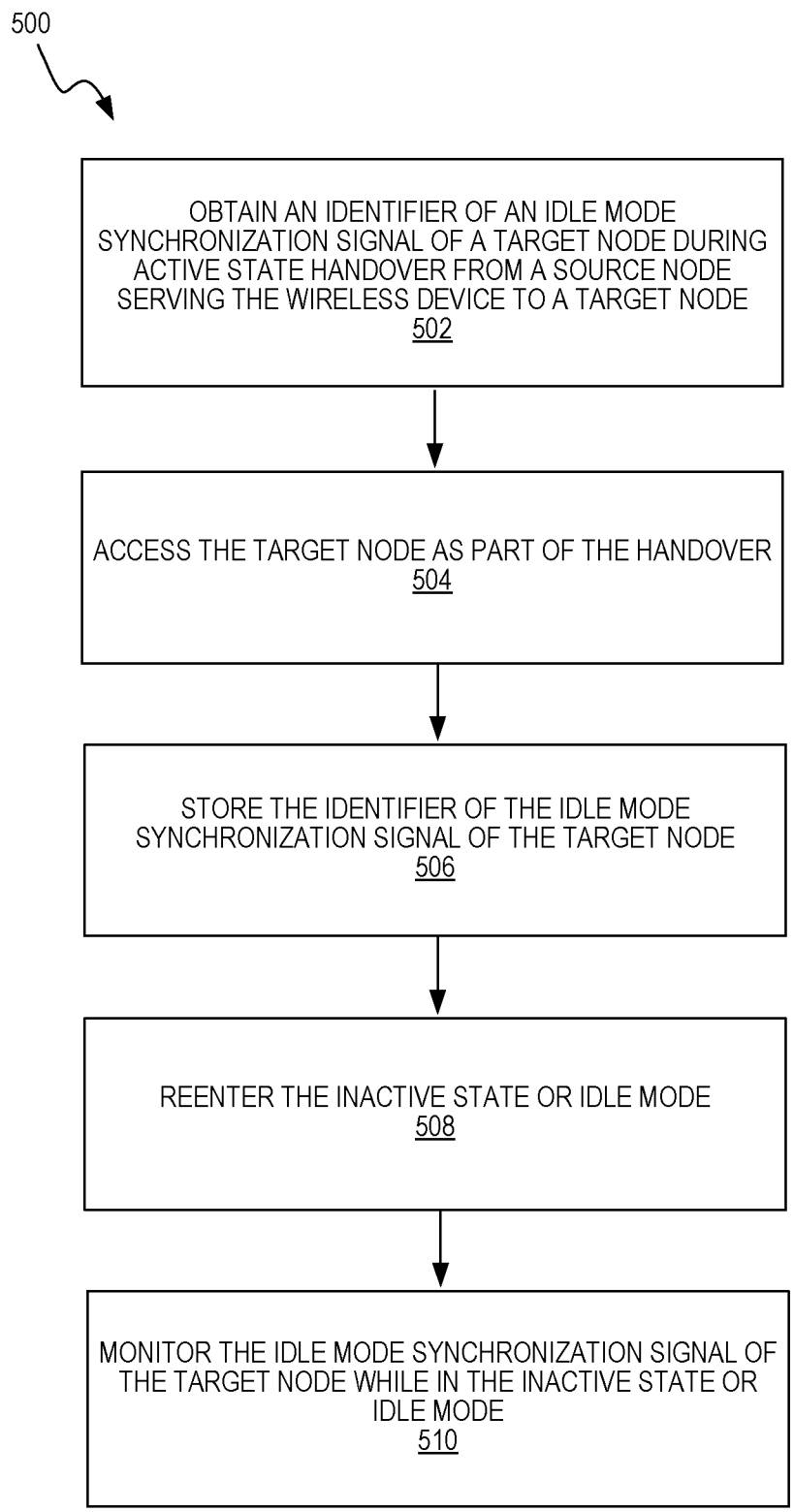
FIG. 5 shows a flow chart illustrating another method at the wireless device for facilitating a transition of the wireless device between an active state and an inactive state/idle mode, according to some embodiments.
Figure 6:
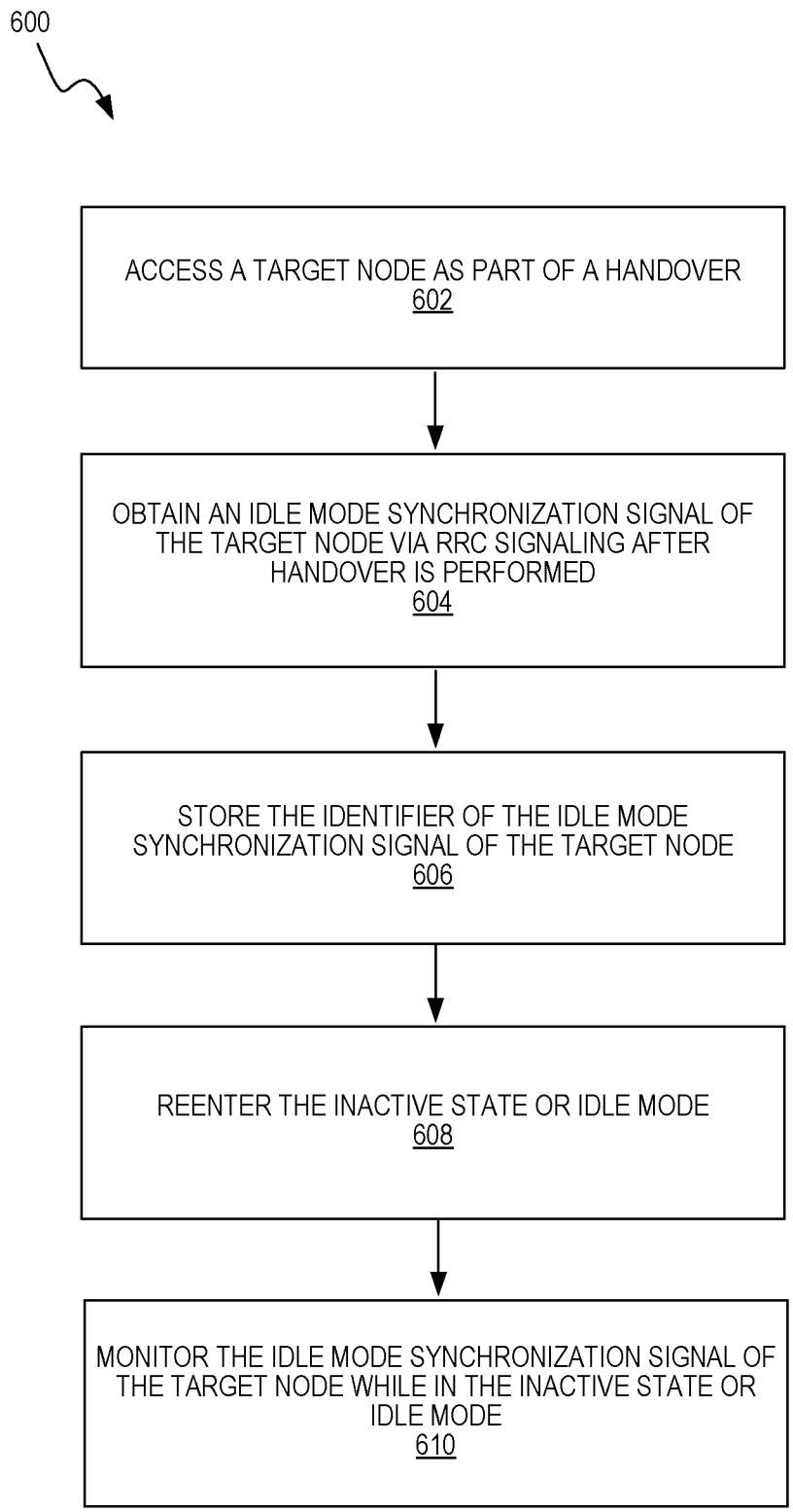
FIG. 6 shows a flow chart illustrating another method at the wireless device for facilitating a transition of the wireless device between an active state and an inactive state/idle mode, according to some embodiments.

Likewise, in some embodiments, the processing circuitry 52 is configured to perform a method such as any of methods 400-600 illustrated by FIGS. 4-6. The method 400 shown by FIG. 4 includes storing an identifier of an idle mode synchronization signal of a source node serving the wireless device responsive to entering an active state from an inactive state or idle mode (block 402), reentering the inactive state or idle mode (block 404) and monitoring the idle mode synchronization signal of the source node while in the inactive state or idle mode (block 406).

In some embodiments, the method 500 shown by FIG. 5 includes obtaining an identifier of an idle mode synchronization signal of a target node during active state handover from a source node serving the wireless device to a target node (block 502), accessing the target node as part of the handover (block 504) and storing the identifier of the idle mode synchronization signal of the target node (block 506). The method 500 also includes reentering the inactive state or idle mode (block 508) and monitoring the idle mode synchronization signal of the target node while in the inactive state or idle mode (block 510).

The identifier of the idle mode synchronization signal of the target node may be included in a handover command received from the source node.

In some cases, the storing is performed responsive to attachment to the target node or responsive to transmitting a handover completion message to the target node. The storing may include overwriting a stored identifier of an idle mode synchronization signal of the source node with the identifier of the idle mode synchronization signal of the target node.

In some embodiments, the method 600 shown by FIG. 6 includes accessing a target node as part of a handover from a source node serving the wireless device to the target node (block 602), obtaining an idle mode synchronization signal of the target node via RRC signaling after handover is performed (block 604) and storing the identifier of the idle mode synchronization signal of the target node (block 606). The method 600 further includes reentering the inactive state or idle mode (block 608) and monitoring the idle mode synchronization signal of the target node while in the inactive state or idle mode (block 610).

The identifier of the idle mode synchronization signal of the target node may be included as part of an RRC reconfiguration that the target node performs upon receiving the wireless device via handover.

In some embodiments, the storing of the identifier includes overwriting a stored identifier of an idle mode synchronization signal with the identifier of the idle mode synchronization signal of the target node.

In some embodiments, the methods 400-600 may include using information regarding the idle mode synchronization signal of the source node to prioritize state transition upon going to an inactive state/idle mode and coming back to an active state.

Figure 7:
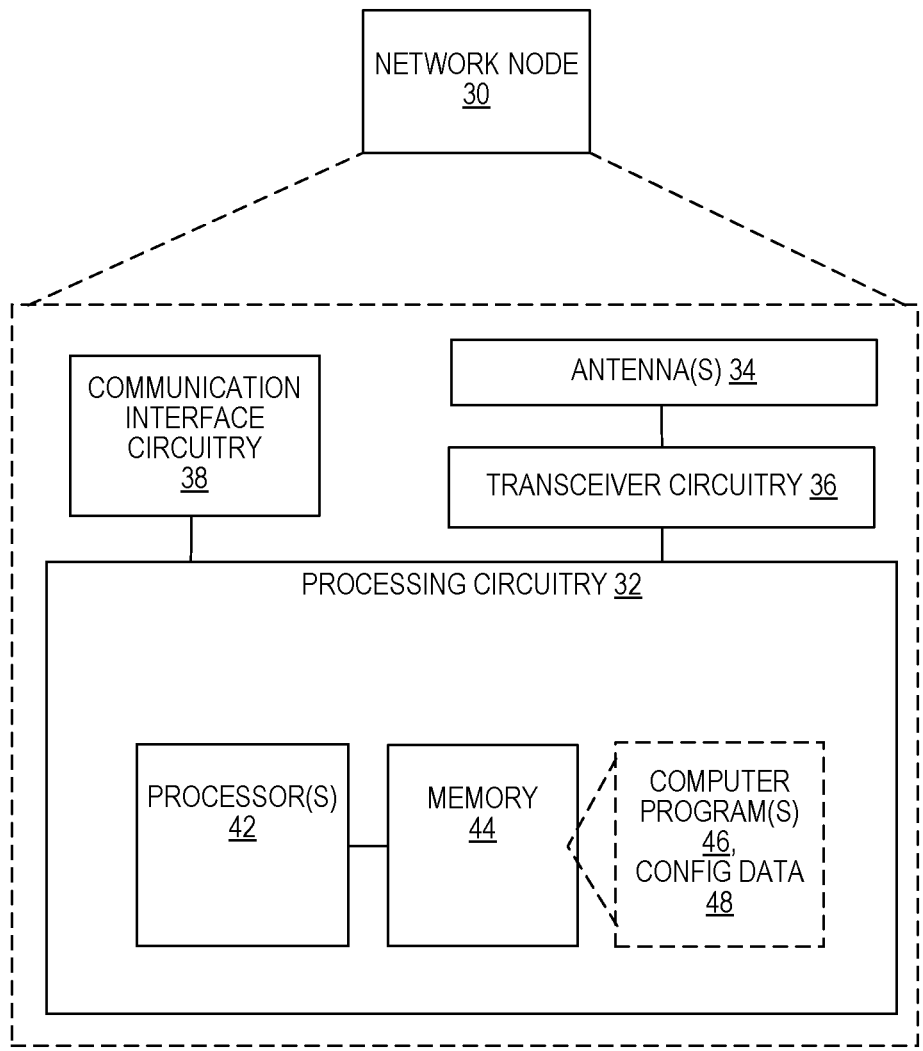
FIG. 7 is a block diagram illustrating a node of a wireless communication network, according to some embodiments.

FIG. 7 illustrates an example node, such as a network node 30, according to some embodiments. The network node 30 may be a radio access network node that facilitates communication between wireless devices and the core network. The network node 30 may represent either the source node or the target node of the embodiments described above. In using the generic terminology of "radio access network node," a radio access network node can be a base station, radio base station, base transceiver station, base station controller, network controller, evolved Node B (eNB), Node B, gNB, relay node, access point, radio access point, Remote Radio Unit (RRU) or Remote Radio Head (RRH). In the case where the transmitting device is a radio access network node, the radio access network node may include a communication interface circuit 38 that includes circuitry for communicating with other nodes in the core network, radio nodes, and/or other types of nodes in the network for the purposes of providing data and cellular communication services.

The network node 30 communicates with other devices via antennas 34 and transceiver circuitry 36. The transceiver circuitry 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, including NR.

The network node 30 also includes one or more processing circuits 32 that are operatively associated with the transceiver circuitry 36 to communicate with other devices and, in some cases, operatively associated with the communication interface circuit 38 to communicate with network nodes. The communication may include multi-carrier operations. The term "multi-carrier" may involve similar terms such as "multi-carrier system", "multi-cell operation", "multi-carrier operation", and "multi-carrier" transmission and/or reception. Multi-carrier operation may also be considered to involve CA.

For ease of discussion, the one or more processing circuits 32 are referred to hereafter as "the processing circuitry 32." The processing circuitry 32 comprises one or more digital processors 42, e.g., one or more microprocessors, microcontrollers, DSPs, FPGAs, CPLDs, ASICs, or any mix thereof. More generally, the processing circuitry 32 may comprise fixed circuitry, or programmable circuitry that is specially configured via the execution of program instructions implementing the functionality taught herein, or may comprise some mix of fixed and programmed circuitry. The processor 42 may be multi-core having two or more processor cores utilized for enhanced performance, reduced power consumption, and more efficient simultaneous processing of multiple tasks.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuitry 32 and/or separate from the processing circuitry 32.

In some embodiments, the processor 42 of the processing circuitry 32 executes a computer program 46 stored in the memory 44 that configures the processor 42 to facilitate a transition of the wireless device between an active state and an inactive state. The processing circuitry 32 in this case is configured to operate as a source node with respect to handover of a wireless device. In such a case, the processing circuitry 32 is configured to transmit an identifier of an idle mode synchronization signal of a target node in a handover command to the wireless device during active state handover to a target node. Mobility control information may be received from the target node in a handover acknowledge message. The wireless device will attach to the target node as part of the handover and a handover completion message will be sent.

In other embodiments, the processing circuitry 32 is configured to operate as a target node with respect to a handover of a wireless device from a source node serving the wireless device to the target node. In this case, the processing circuitry 32 is configured to attach the wireless device to the target node as part of the handover, receive a handover completion message from the wireless device and transmit an identifier of an idle mode synchronization signal of a target node to the wireless device.

Figure 9:
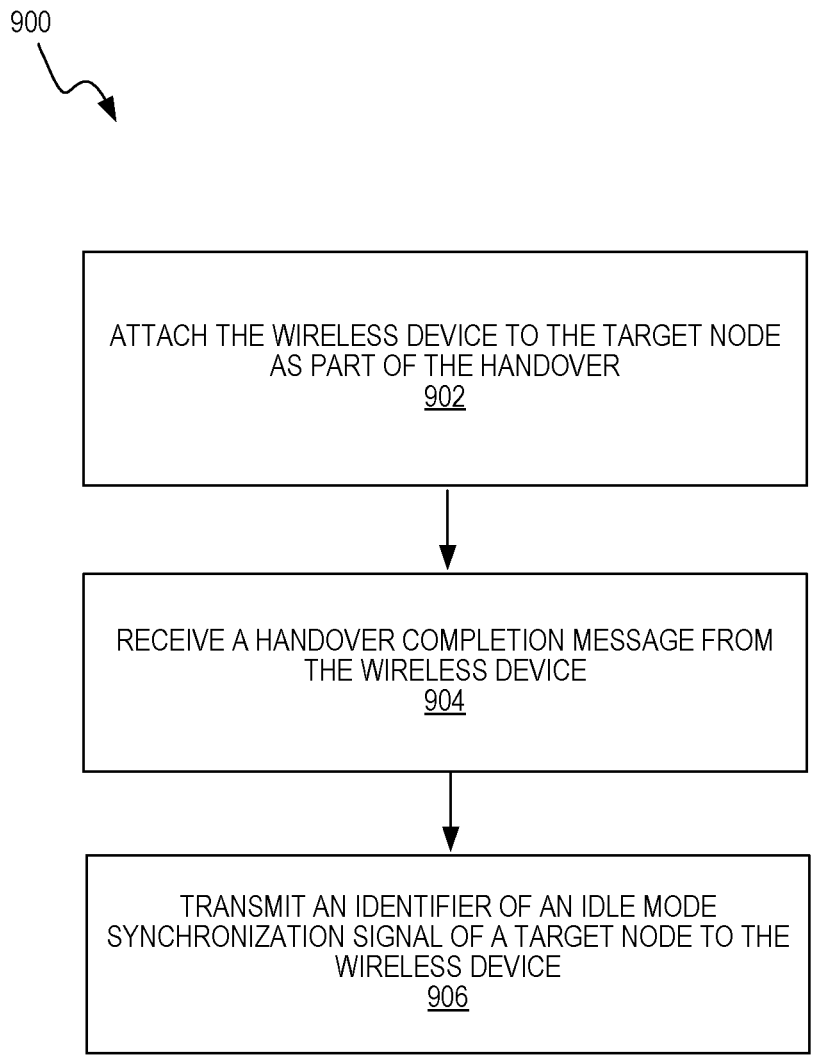
FIG. 9 shows a flow chart illustrating a method at a target node for facilitating a transition of the wireless device between an active state and an inactive state/idle mode, according to some embodiments.

The processing circuitry 32 of the network node 30 is configured to perform various methods, such as methods 800-900 of FIGS. 8 and 9 that correspond to the operations of the source node and the target node. In source node embodiments, the method 800 includes transmitting an identifier of an idle mode synchronization signal of a target node in a handover command to the wireless device during active state handover to a target node (block 802). Mobility control information may be received from the target node in a handover acknowledgement message.

In target node embodiments, the method 900 includes attaching the wireless device to the target node as part of the handover (block 902), receiving a handover completion message from the wireless device (block 904) and transmitting an identifier of an idle mode synchronization signal of a target node to the wireless device (block 906).

Transmitting the identifier of the idle mode synchronization signal of the target node to the wireless device may include transmitting the identifier of the idle mode synchronization signal via RRC signaling. The identifier of the idle mode synchronization signal of the target node may be included as part of an RRC re-configuration that the target node performs upon receiving the wireless device via the handover. Mobility control information may be transmitted to the source node in a handover acknowledge message.

According to additional embodiments, the wireless device may obtain the idle mode synchronization signal of the serving node that it is connected to in active mode. In a first case, the device is storing the synchronization signal that the device used to access the network while transitioning from the inactive state/idle mode to active mode. FIG. 10 illustrates a similar embodiment with block 100, where the device transmits from an inactive state/idle mode to an active state and stores the idle mode synchronization signal based on which synchronization signal it used to access the network. In this method, the device remembers the synchronization signal it used to access the system and the device depends on the network to inform it of the synchronization signal of the new node upon handover.

Figure 11:
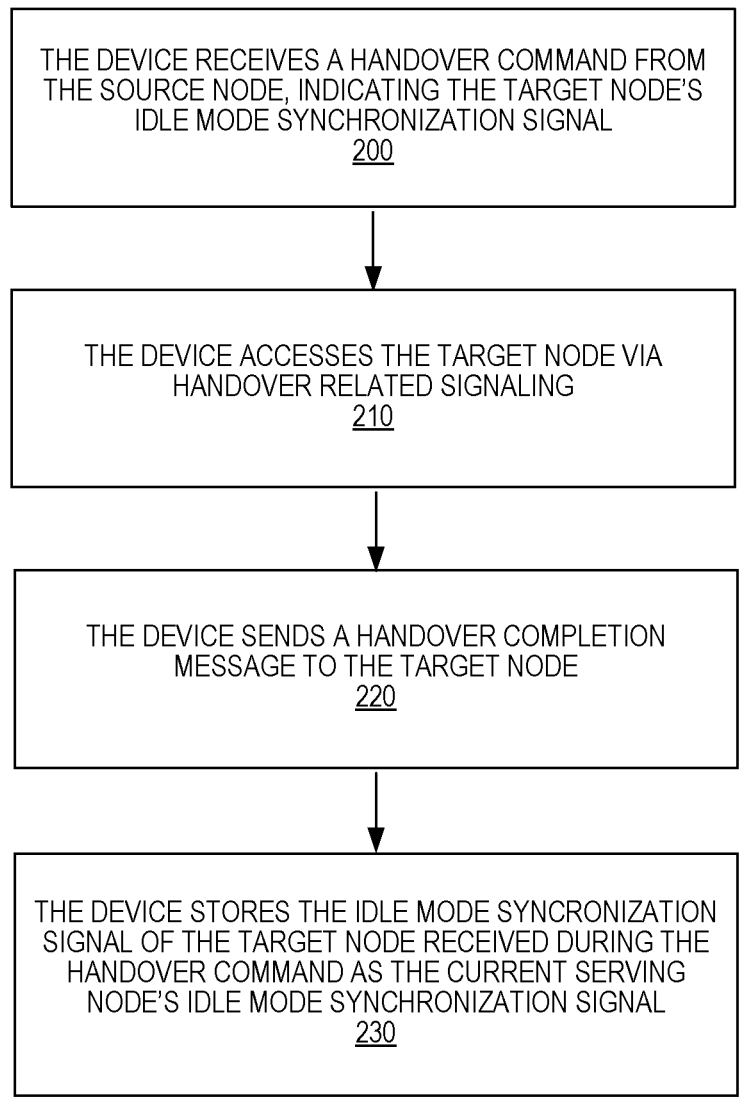
FIG. 11 shows a flow chart illustrating another method for facilitating a transition of the wireless device between an active state and an inactive state/idle mode, according to some embodiments.

In a second case, FIG. 11 illustrates steps 200-230, where the device receives a handover command from the source node indicating the target node's idle mode synchronization signal (block 200). The device accesses the target network node via handover related signaling (block 210). The device then sends a handover completion message to the target network node (block 220). The device stores the idle mode synchronization signal of the target node received during the handover command as the current serving node's idle mode synchronization signal (block 230).

In this second case, the device is informed of the idle mode synchronization signal of the target node by the original source node while making an active state handover. In this method, the idle mode synchronization signal of the target node is part of the handover command sent by the source node to the device, and the device overwrites the stored idle mode synchronization signal information element with the new idle mode synchronization signal information element in the handover command upon sending the handover confirmation type of message to the target node. This may be once the device attaches to the target node.

Figure 12:
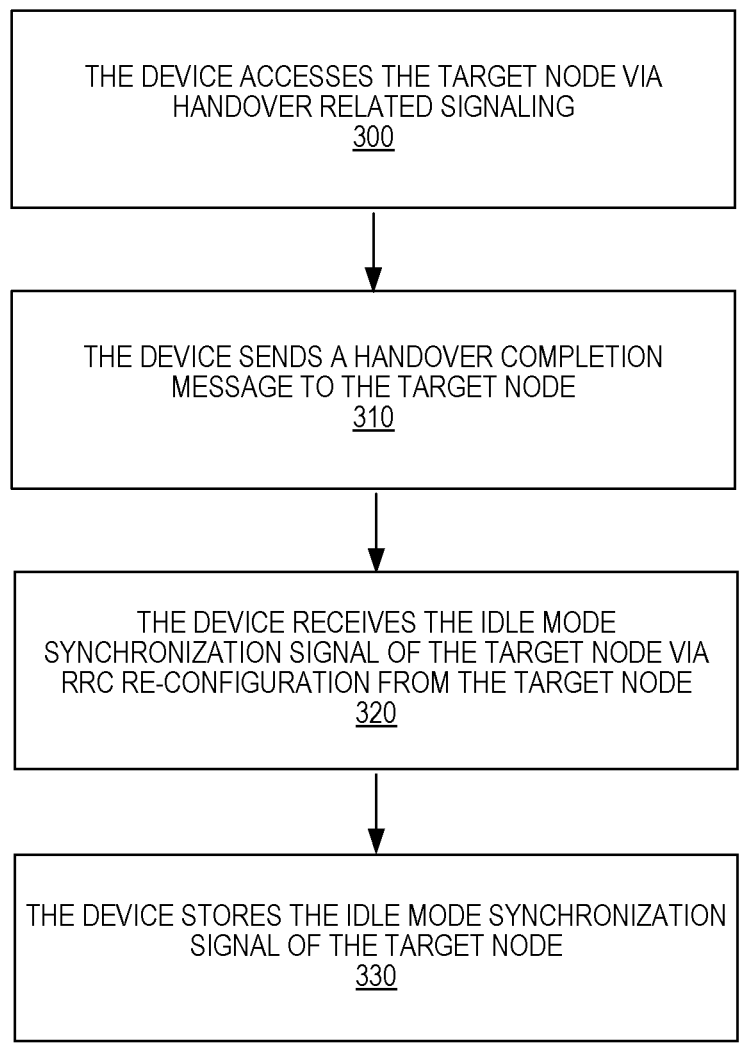
FIG. 12 shows a flow chart illustrating another method for facilitating a transition of the wireless device between an active state and an inactive state/idle mode, according to some embodiments.

In a third case, FIG. 12 illustrates steps 300-330, where the device accesses the target node via handover related signaling (step 300). The device sends a handover completion message to the target node (step 310). The device receives the idle mode synchronization signal of the target network node via RRC re-configuration from the said target node (step 320). The device stores the idle mode synchronization signal of the target node (step 330).

In this third case, the device is informed of the idle mode synchronization signal of the current serving node via RRC re-configuration after handover is performed. In this method, the idle mode synchronization signal of the target node is part of the RRC re-configuration that the target node does upon receiving the device via handover from some other node. The device overwrites the stored idle mode synchronization signal with the newly received idle mode synchronization signal as the currently serving node's synchronization signal.

According to some embodiments, the first case can be used along with second case only for making sure that the device is aware of the required synchronization signal information. In the same way, the first case can be used with the third case only for the same purpose. It should also be noted that third case can be used by itself without in conjunction with the first and second cases and in such a scenario, a node will perform the RRC re-configuration towards the device whenever a device comes into its service either via initial access or via handover from some other node.

Advantages include that the device could use the information regarding the idle mode synchronization signal of the node that it is attached to in connected mode to prioritize the state transition, or which node to connect to, upon going to inactive and coming back to active. Also, when the device undergoes a radio link failure (RLF), due to the failed aggressive beamforming from the source node in the active state, the device could use this information to re-establish in the same node if the synchronization signal transmission from that node is audible.

Other advantages include aiding the device when it may need to have information on which synchronization signal or signature (SS) to measure when going to idle mode/inactive state. This could especially be needed in the case where there are carriers with no SSB transmission, where the UE would need to monitor transmissions from another node in order to retrieve the SS of the target node.

In sum, the various embodiments aid the transition from idle mode/inactive state to active state (the UE will connect to the correct active mode cell) and the transition from active to idle mode/inactive state (the UE will know which SS to monitor in idle mode/inactive state).

Figure 13:
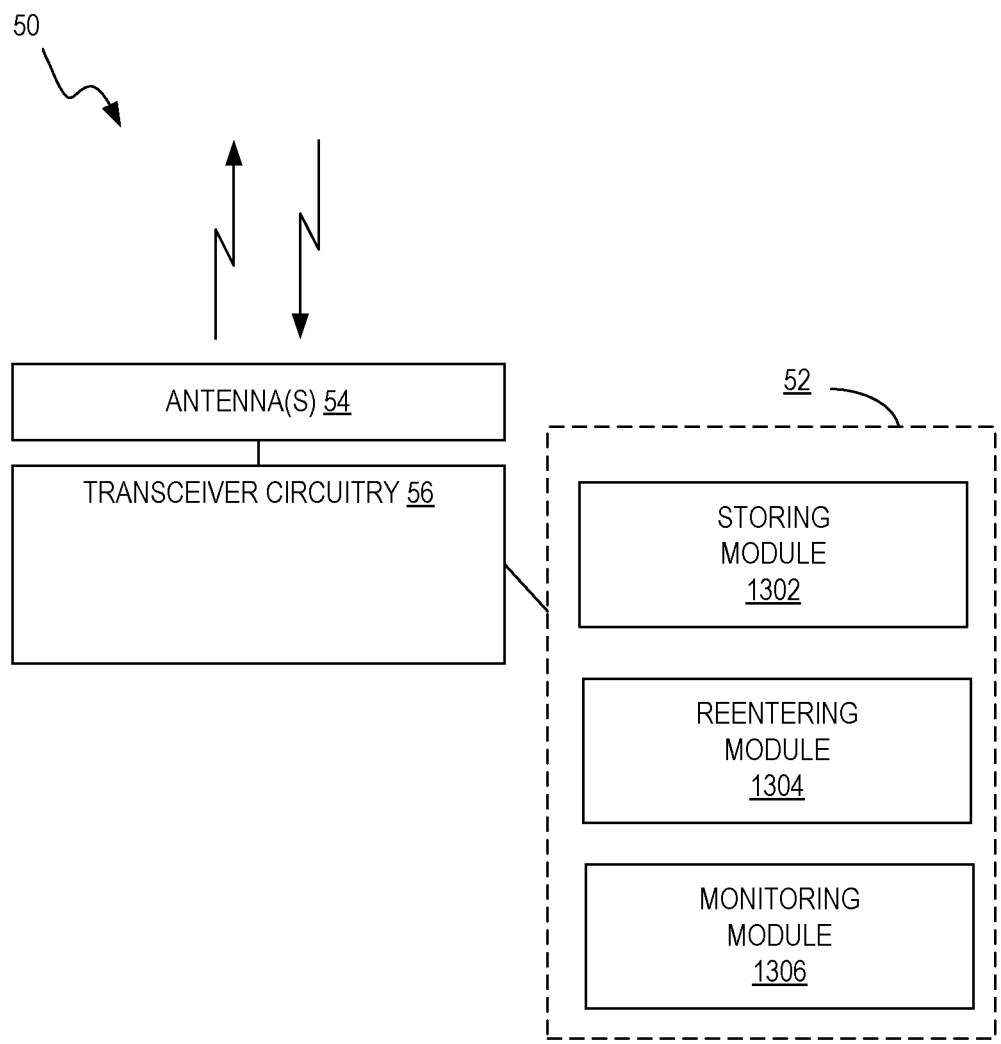
FIG. 13 is a block diagram illustrating a functional implementation of a wireless device, according to some embodiments.

FIG. 13 illustrates an example functional module or circuit architecture as may be implemented in a wireless device 50. The illustrated embodiment at least functionally includes a storing module 1302 for storing an identifier of an idle mode synchronization signal of a source node serving the wireless device responsive to entering an active state from an inactive state/idle mode, a reentering module 1304 for reentering the inactive state/idle mode, and a monitoring module 1306 for monitoring the idle mode synchronization signal of the source node while in the inactive state/idle mode.

Figure 14:
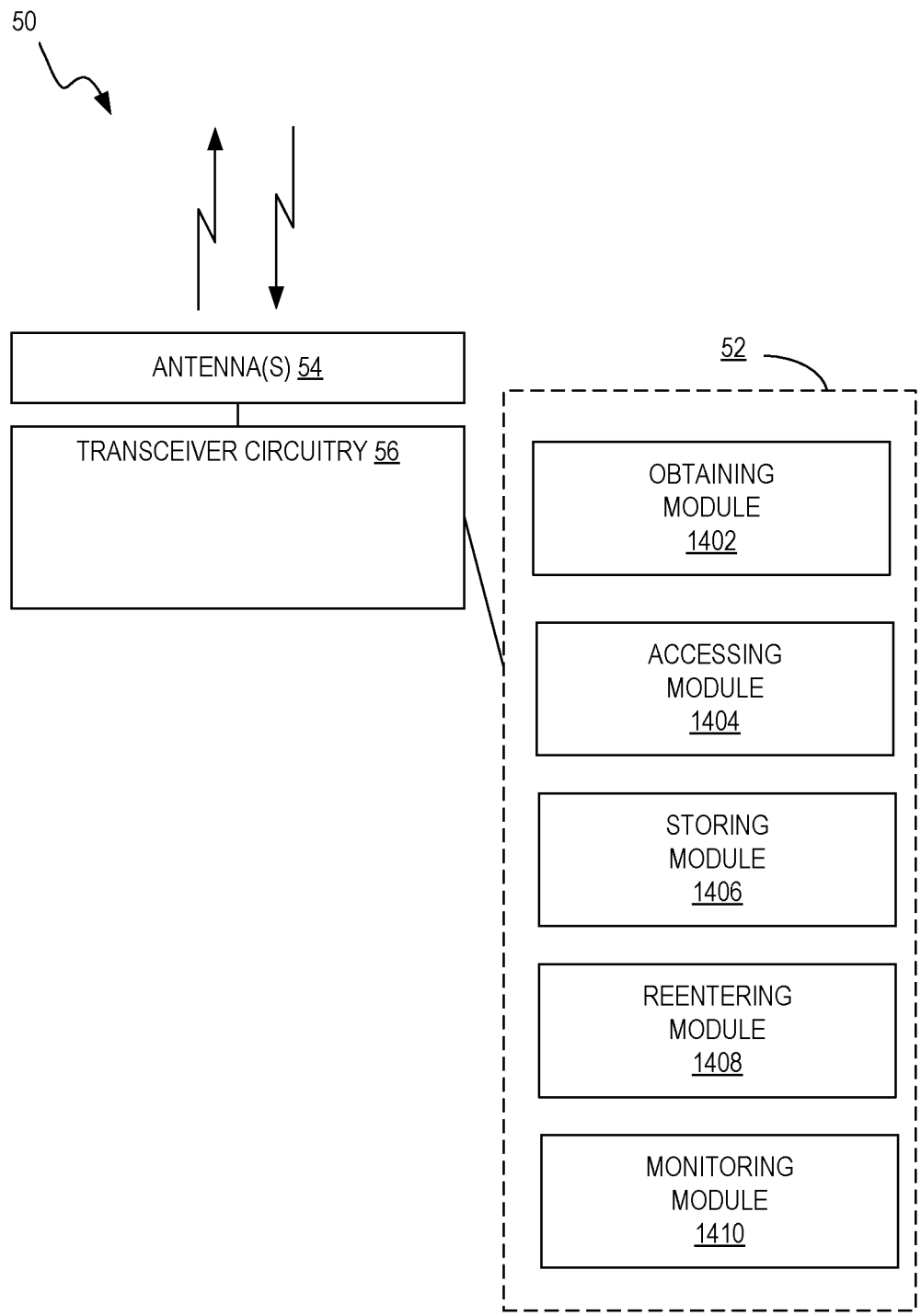
FIG. 14 is a block diagram illustrating another functional implementation of the wireless device, according to some embodiments.

FIG. 14 illustrates an example functional module or circuit architecture as may be implemented in a wireless device 50. The illustrated embodiment at least functionally includes an obtaining module 1402 for obtaining an identifier of an idle synchronization signal of a target node during active state handover from a source node serving the wireless device to a target node, an accessing module 1404 for accessing the target node as part of the handover, and a storing module 1406 for storing the identifier of the idle mode synchronization signal of the target node. The implementation also includes a reentering module 1408 for reentering the inactive state or idle mode and a monitoring module 1410 for monitoring the idle mode synchronization signal of the target node while in the inactive state or idle mode.

Figure 15:
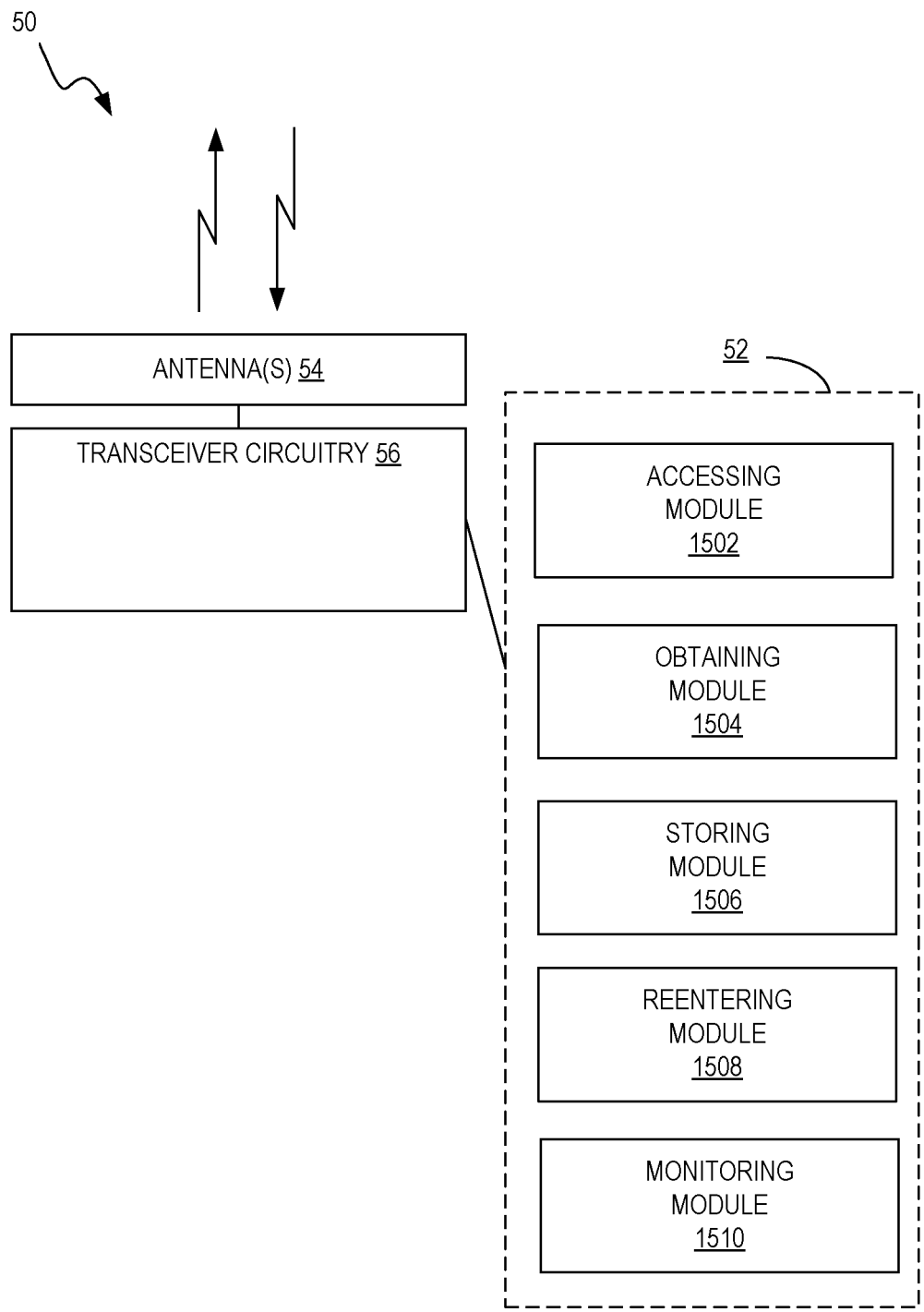
FIG. 15 is a block diagram illustrating another functional implementation of the wireless device, according to some embodiments.

FIG. 15 illustrates an example functional module or circuit architecture as may be implemented in a wireless device 50. The illustrated embodiment at least functionally includes an accessing module 1502 for accessing a target node as part of a handover from a source node serving the wireless device to the target node, an obtaining module 1504 for obtaining an idle mode synchronization signal of the target node via RRC signaling after handover is performed, and a storing module 1506 for storing the identifier of the idle mode synchronization signal of the target node. The implementation also includes a reentering module 1508 for reentering the inactive state or idle mode and a monitoring module 1510 for monitoring the idle mode synchronization signal of the target node while in the inactive state or idle mode.

Figure 16:
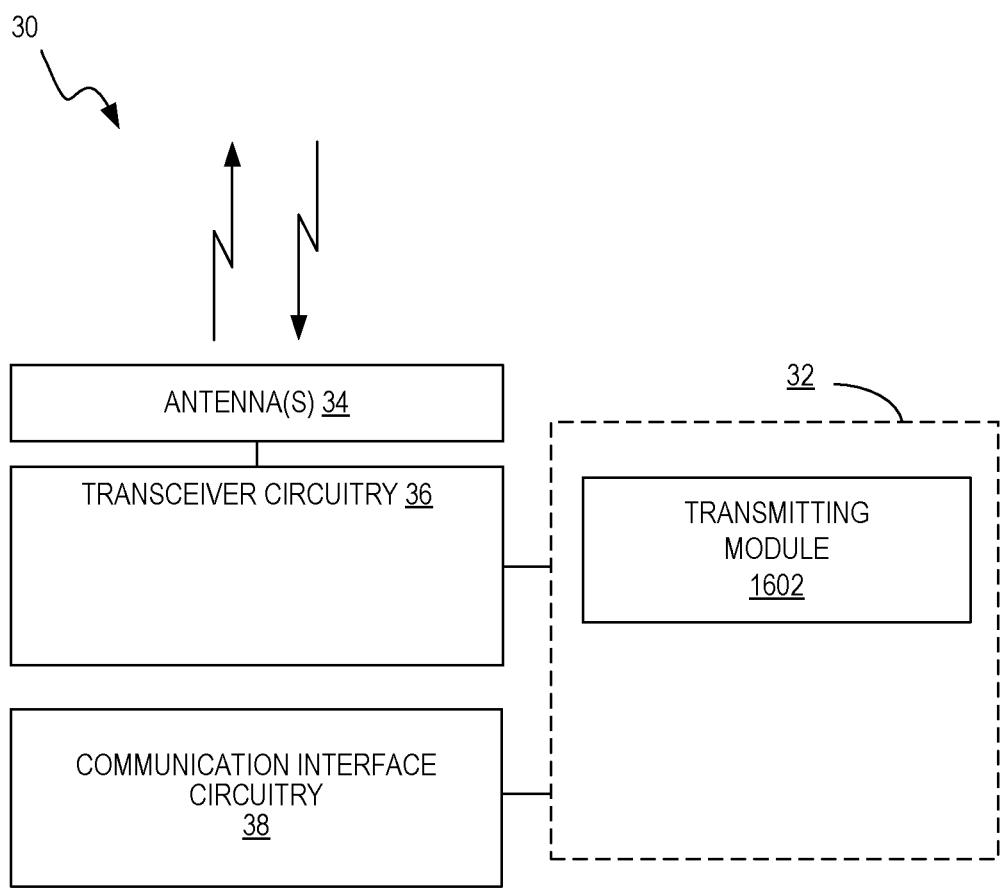
FIG. 16 is a block diagram illustrating a functional implementation of a source node, according to some embodiments.

FIG. 16 illustrates an example functional module or circuit architecture as may be implemented in a source node 30. The illustrated embodiment at least functionally includes a transmitting module 1602 for transmitting an identifier of an idle mode synchronization signal of a target node in a handover command to the wireless device during active state handover to a target node.

Figure 17:
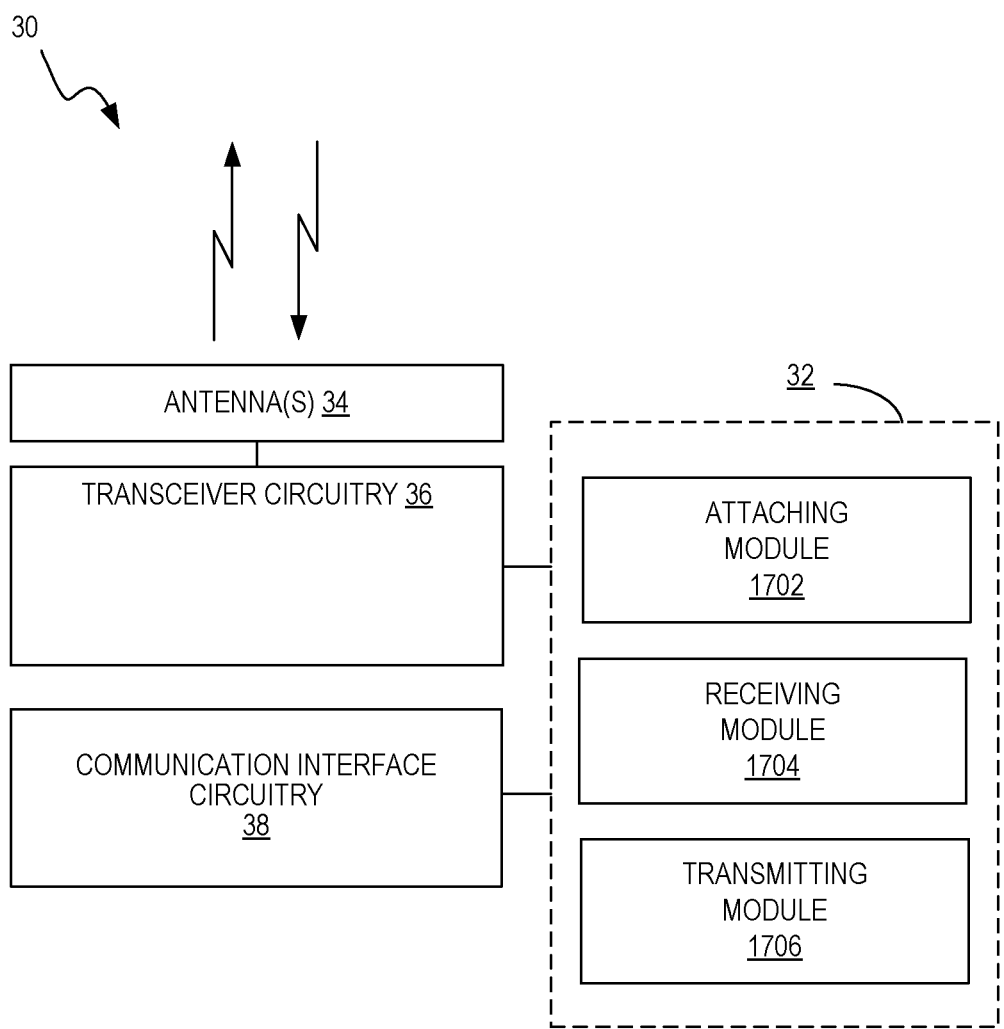
FIG. 17 is a block diagram illustrating a functional implementation of a target node, according to some embodiments.

FIG. 17 illustrates an example functional module or circuit architecture as may be implemented in a target node 30. The illustrated embodiment at least functionally includes an attaching module 1702 for attaching the wireless device to the target node as part of the handover, a receiving module 1704 for receiving a handover completion message from the wireless device, and a transmitting module 1706 for transmitting an identifier of an idle mode synchronization signal of a target node to the wireless device.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a wireless device operating in a wireless communication network, for facilitating a transition of the wireless device between an active state and an inactive state or idle mode, wherein the method comprises:
   storing an identifier of an idle mode synchronization signal of a node serving the wireless device, responsive to entering an active state from an inactive state or idle mode;
   re-entering the inactive state or idle mode; and
   monitoring the idle mode synchronization signal of the node while in the inactive state or idle mode.

2. A method, in a wireless device operating in a wireless communication network, for facilitating a transition of the wireless device between an active state and an inactive state or idle mode, wherein the method comprises:
   obtaining an identifier of an idle mode synchronization signal of a target node during active state handover from a source node serving the wireless device to a target node;
   accessing the target node as part of the handover;
   storing the identifier of the idle mode synchronization signal of the target node;
   re-entering the inactive state or idle mode; and
   monitoring the idle mode synchronization signal of the target node while in the inactive state or idle mode.

3. The method of claim 2, wherein obtaining the identifier comprises receiving the identifier of the idle mode synchronization signal of the target node in a handover command received from the source node.

4. The method of claim 2, wherein the storing is performed responsive to attachment to the target node or responsive to transmitting a handover completion message to the target node.

5. The method of claim 2, wherein storing the identifier comprises overwriting a stored identifier of an idle mode synchronization signal of the source node with the identifier of the idle mode synchronization signal of the target node.

6. A method, in a wireless device operating in a wireless communication network, for facilitating a transition of the wireless device between an active state and an inactive state or idle mode, wherein the method comprises:
   accessing a target node as part of a handover from a source node serving the wireless device to the target node;
   obtaining an idle mode synchronization signal of the target node via Radio Resource Control (RRC) signaling after the handover is performed;
   storing an identifier of the idle mode synchronization signal of the target node;
   re-entering the inactive state or idle mode; and
   monitoring the idle mode synchronization signal of the target node while in the inactive state or idle mode.

7. The method of claim 6, wherein the identifier of the idle mode synchronization signal of the target node is included as part of an RRC re-configuration that the target performs upon receiving the wireless device via the handover.

8. The method of claim 6, wherein storing the identifier comprises overwriting a stored identifier of an idle mode synchronization signal with the identifier of the idle mode synchronization signal of the target node.

9. A method, in a target node for facilitating a transition of a wireless device between an active state and an inactive state, wherein the method comprises:
   attaching the wireless device to the target node as part of a handover from a source node serving the wireless device to the target node;
   receiving a handover completion message from the wireless device; and
   transmitting an identifier of an idle mode synchronization signal of the target node to the wireless device.

10. The method of claim 9, wherein transmitting the identifier of the idle mode synchronization signal of the target node to the wireless device comprises transmitting the identifier of the idle mode synchronization signal via Radio Resource Control (RRC) signaling.

11. The method of claim 9, wherein the identifier of the idle mode synchronization signal of the target node is included as part of a Radio Resource Control (RRC) re-configuration that the target node performs upon receiving the wireless device via the handover.

12. The method of claim 9, further comprising transmitting mobility control information to the source node in a handover acknowledge message.

13. A wireless device configured to operate in a wireless communication network and facilitate a transition of the wireless device between an active state and an inactive state or idle mode, wherein the wireless device comprises:
- transceiver circuitry configured for transmitting and receiving signals; and
- processing circuitry operatively associated with the transceiver circuitry and configured to:
- store an identifier of an idle mode synchronization signal of a node serving the wireless device, responsive to entering an active state from an inactive state or idle mode;
- re-enter the inactive state or idle mode; and
- monitor the idle mode synchronization signal of the node while in the inactive state or idle mode.

14. A wireless device configured to operate in a wireless communication network and facilitate a transition of the wireless device between an active state and an inactive state or idle mode, wherein the wireless device comprises:
- transceiver circuitry configured for transmitting and receiving signals; and
- processing circuitry operatively associated with the transceiver circuitry and configured to:
- obtain an identifier of an idle mode synchronization signal of a target node during active state handover from a source node serving the wireless device to a target node;
- access the target node as part of the handover;
- store the identifier of the idle mode synchronization signal of the target node;
- re-enter the inactive state or idle mode; and
- monitor the idle mode synchronization signal of the target node while in the inactive state or idle mode.

15. The wireless device of claim 14, wherein the processing circuitry is configured to obtain the identifier by receiving the identifier of the idle mode synchronization signal of the target node in a handover command received from the source node.

16. The wireless device of claim 14, wherein the processing circuitry is configured to store the identifier responsive to attachment to the target node or responsive to transmitting a handover completion message to the target node.

17. The wireless device of claim 14, wherein the processing circuitry is configured to store the identifier by overwriting a stored identifier of an idle mode synchronization signal of the source node with the identifier of the idle mode synchronization signal of the target node.

18. A wireless device configured to operate in a wireless communication network and facilitate a transition of the wireless device between an active state and an inactive state or idle mode, wherein the wireless device comprises:
- transceiver circuitry configured for transmitting and receiving signals; and
- processing circuitry operatively associated with the transceiver circuitry and configured to:
- access a target node as part of a handover from a source node serving the wireless device to the target node;
- obtain an idle mode synchronization signal of the target node via Radio Resource Control (RRC) signaling after the handover is performed;
- store an identifier of the idle mode synchronization signal of the target node;
- re-enter the inactive state or idle mode; and
- monitor the idle mode synchronization signal of the target node while in the inactive state or idle mode.

19. The wireless device of claim 18, wherein the identifier of the idle mode synchronization signal of the target node is included as part of an RRC re-configuration that the target performs upon receiving the wireless device via the handover.

20. The wireless device of claim 18, wherein the processing circuitry is configured to store the identifier by overwriting a stored identifier of an idle mode synchronization signal with the identifier of the idle mode synchronization signal of the target node.

21. A source node configured to serve a wireless device in a wireless communication network and facilitate a transition of the wireless device between an active state and an inactive state or idle mode, wherein the source node comprises:
- transceiver circuitry configured for communicating with the wireless device;
- communication interface circuitry configured to communicate with other network nodes; and
- processing circuitry operatively associated with the transceiver circuitry and the communication interface circuitry and configured to:
- transmit an identifier of an idle mode synchronization signal of a target node in a handover command to the wireless device during active state handover to a target node.

22. The source node of claim 21, wherein the processing circuitry is configured to receive mobility control information from the target node in a handover acknowledge message.

23. A target node configured to facilitate a transition of a wireless device between an active state and an inactive state, wherein the target node comprises:
- transceiver circuitry configured for communicating with the wireless device;
- communication interface circuitry configured to communicate with other network nodes; and
- processing circuitry operatively associated with the transceiver circuitry and the communication interface circuitry and configured to:
- attach the wireless device to the target node as part of a handover from a source node serving the wireless device to the target node;
- receive a handover completion message from the wireless device; and
- transmit an identifier of an idle mode synchronization signal of the target node to the wireless device.

24. The target node of claim 23, wherein the processing circuitry is configured to transmit the identifier by via Radio Resource Control (RRC) signaling.

25. The target node of claim 23, wherein the identifier of the idle mode synchronization signal of the target node is included as part of a Radio Resource Control (RRC) re-configuration that the target node performs upon receiving the wireless device via the handover.

26. The target node of claim 23, wherein the processing circuitry is configured to transmit mobility control information to the source node in a handover acknowledge message.

* * * * *